Figure 1:
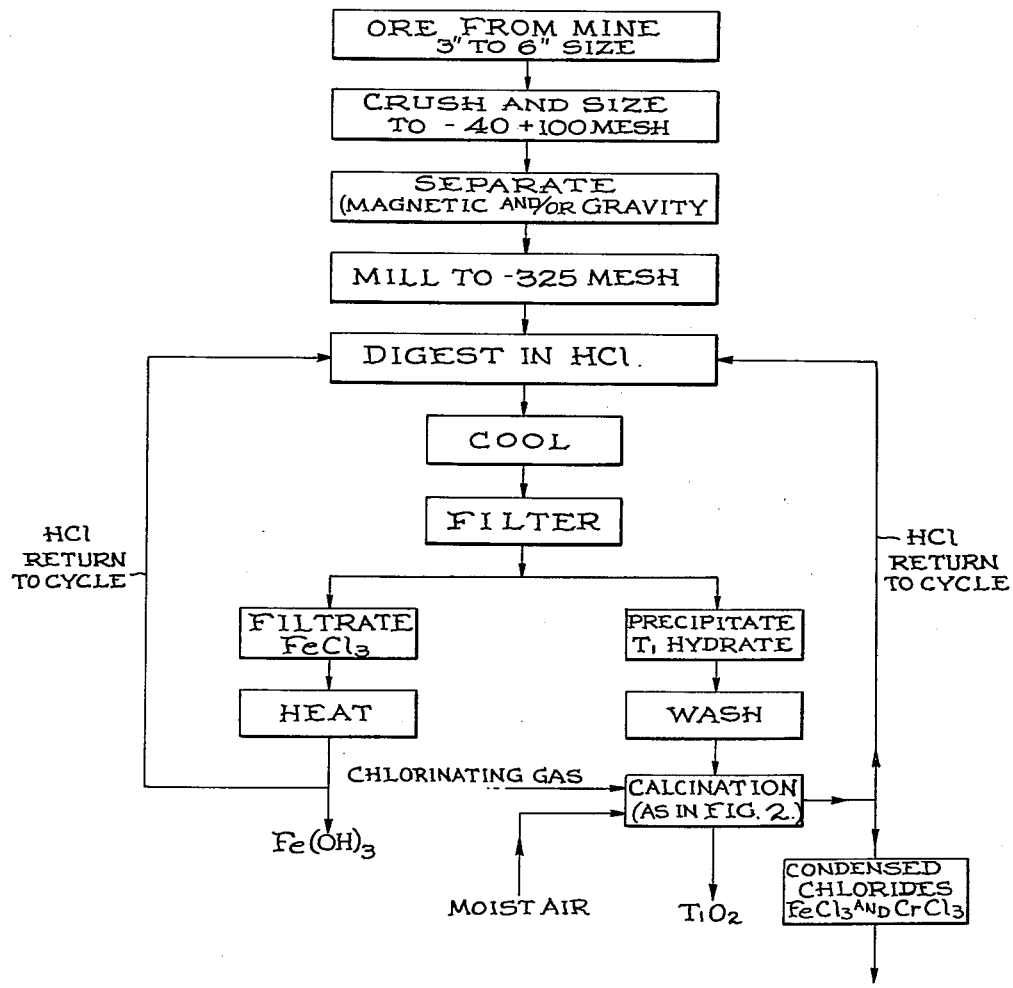

Oct. 31, 1961     E. WAINER     3,006,728

PREPARATION OF CERAMIC GRADE TITANIUM DIOXIDE

Filed Sept. 10, 1959

INVENTOR
EUGENE WAINER.
BY Lawrence I. Field
ATTORNEY

United States Patent Office 3,006,728
Patented Oct. 31, 1961

3,006,728
PREPARATION OF CERAMIC GRADE TITANIUM DIOXIDE
Eugene Wainer, Cleveland Heights, Ohio, assignor to Horizons Incorporated, Cleveland, Ohio, a corporation of New Jersey
Filed Sept. 10, 1959, Ser. No. 839,140
9 Claims. (Cl. 23—202)

This invention relates to the treatment of iron-bearing titanium oxide materials including ores such as ilmenite, ore concentrates, impure titanium dioxides and the like, to obtain a ceramic grade titanium dioxide product.

More particularly, it relates to the treatment of materials containing large amounts of titanium dioxide in physical or chemical association with oxides or other compounds of iron, chromium and other elements whose presence in titanium dioxide intended for use in white pigment or white enamel formulations is undesirable because they may form colored compounds, especially colored oxides, imparting off-white tints to the titanium dioxide even when present in very minute amounts.

A variety of chemical and physical procedures have been suggested for separating the titanium values from other associated minerals contained in naturally occurring ores. One of the more practical approaches heretofore considered includes digestion of the ore in hydrochloric acid or in other mineral acids, under carefully controlled conditions of pH, temperature and oxidation potential, for example as described in Llewellyn Patent 2,088,913. Inevitably it has been found that when applied to the treatment of ilmenite or other iron-titanium ores, the separation of iron and titanium is so far from complete that the contamination of the titanium dioxide product by compounds of iron is too substantial to permit it to be used as a ceramic grade $TiO_2$ for many applications.

Another suggested procedure for separating the iron content and the titanium content of ilmenite and similar ores involves chlorination. Although some iron may be removed as volatile chlorides from iron-titanium ores without substantial volatilization of the titanium values, generally the iron removal is incomplete and complete removal of the iron may be accomplished only with a considerable loss of titanium. In United States Patents 2,184,884 and 2,184,885 it is suggested that selective chlorination may be carried out more effectively with added carbon more or less intimately mixed with the iron-titanium ore being chlorinated and either in the absence of oxidizing gases (2,184,885) or in the presence of oxidizing gases (2,184,884). When practicing these patented processes it has been found that the presence of carbon in the mixture to be selectively chlorinated involves an unnecessary additional expense, that it leads to the reduction of easily reducible impurities in the ore, and that in some instances it may impair the quality of the product, since it is often difficult to separate the finely divided carbon from the equally finely divided ore, particularly after it has been heated to temperatures upwards of 600° C. for extended intervals of time, but in any event, even with the addition of carbon to the charge the patentees indicate that they were unable to recover all of the titanium free from iron or to remove all of the iron without experiencing some loss of yield of the titanium, regardless of the temperature, atmosphere or amount of carbon in the charge.

By the present invention, a simple process has been provided in which the separation of titanium dioxide from iron, chromium and other impurities which readily form chlorides is accomplished by first separating the bulk of the impurities and particularly the major portion of the iron from the titanium by physical and chemical procedures and then quantitatively separating the remainder of the impurities, by calcining the solid impure $TiO_2$ so obtained, in a moist air atmosphere containing HCl, $Cl_2$, phosgene or mixtures of such chlorinating agents, the content of water vapor present in the mixture being within carefully controlled percentages.

Figure 2:
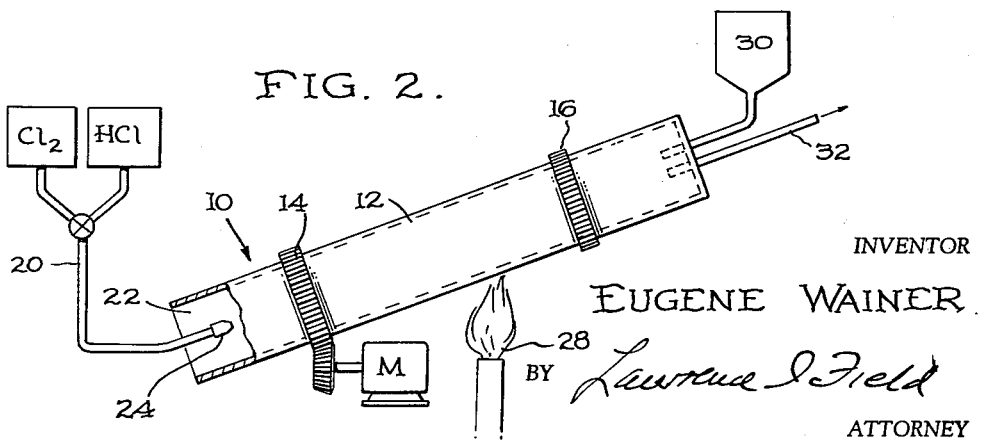

In the drawings: FIGURE 1 is a flow sheet of a preferred process; and FIGURE 2 is a schematic view of one apparatus useful in carrying out a portion of the process.

Briefly, as indicated in the flow sheet, a preferred procedure includes: initially crushing an ilmenite or other suitable raw material to a specific size range; separating out the bulk of the gangue by any suitable technique such as gravity separation or magnetic separation or a combination of gravity and magnetic separation; grinding the resultant concentrate to minus 325 mesh; digesting the finely ground concentrate in concentrated hydrochloric acid for periods ranging from 14 to 24 hours; cooling the resulting products; filtering; washing the filter cake with water (preferably water acidified with 1% HCl); drying the washed filter cake, and thereafter calcining the dried filter cake in a carefully controlled atmosphere.

In an earlier application, Serial No. 590,101, filed June 8, 1956, and issued on November 24, 1959, as United States Patent 2,914,381, there is described a modification of the procedure of the aforesaid Llewellyn patent in which the particles of the ore finer than 65 mesh are removed from the solids to be digested with HCl and this constitutes a preferred manner of carrying out the present process, in order to obtain a concentrate low in both silica and iron oxide.

It has been found that concentrates, prepared as above described, and consisting of titanium dioxide contaminated with up to about 5% by weight of iron oxide (generally 0.5% to 2%) and up to about 5% by weight of silica (generally between 1% and 2%) when subjected to the action of various chlorinating agents, for instance, by calcining the concentrate in a rotary drum containing a carefully controlled chlorinating atmosphere yielded products of widely different purities.

Thus in an atmosphere of dried hydrogen chloride gas, between 75% and 80% of the iron may be removed before the titanium starts to volatilize. With HCl which had not been treated to remove moisture, from about 90% to about 95% of the iron could be removed before there was an appreciable tendency for the titanium to volatilize. Other dry mixtures of air and chlorinating gases such as HCl, $Cl_2$ and phosgene, have been used to effect the removal of an even larger proportion of the iron from concentrates, but in each instance, using dry gas mixtures, it was found that quantitative removal of the iron without any accompanying loss of titanium was impossible to achieve.

However, in accordance with the present invention, it was found that the use of a mixture of chlorinating gases with air containing between 0.5 and 5.0% by weight of water, suppressed the tendency of the titanium to form a volatile product ($TiCl_4$) to such an extent that it was possible to effect a quantitative removal of iron and such other chlorinatible impurities as chromium, nickel, cobalt and the like, without any appreciable loss of titanium.

More specifically, it has been found that in one preferred embodiment of the invention the atmosphere in the chlorinating vessel should consist of the following proportions, by weight:

HCl:$Cl_2$—between 80% and 40% of the total mixture, the relative proportions of HCl:$Cl_2$ being between 1:4 and 4:1 (by volume).

Air—between 20% and 60% of the total mixture, the air to contain from 0.5 and 5.0% of water, by weight.

PRELIMINARY TREATMENT

The raw material used was a massive ilmenite ore from the Ivry-Nord deposit located near Terrebonne in the province of Quebec in Canada and having the following approximate analysis (expressed in percent by weight):

|  | Average | Range |
|---|---|---|
| $TiO_2$ | 31.0 | 30–34 |
| $SiO_2$ | 7.0 | 2–8 |
| $Al_2O_3$ | 1.5 | 0.5–3 |
| S | 1.2 | 0.3–2.0 |
| $Fe_2O_3$ | 52.2 | 50–55 |
| FeO | 3.5 | 3–5 |
| Total iron | 38.5 | 35–40 |

The ilmenite had been crushed to lumps between 3 inches and 6 inches in size at the mine and was thereafter further comminuted by conventional means. That fraction of the comminuted ore finer than 40 mesh (Tyler standard) and coarser than 100 mesh (Tyler standard) was retained for concentration.

The retained fraction was then thoroughly washed and oven dried at 225° C. Standard cone washing facilitated the removal of fines and water soluble inclusions. Using a Carpco laboratory model high intensity induced roll magnetic separator the ore was first scalped at a low flux and slow rotor speed and then at higher flux and faster rotor speeds for optimum separation of both the non-magnetics and the magnetic portions from a middle fraction comprising the product to be further treated.

In two typical runs, milled ore was separated into three fractions as follows:

|  | Weight (grams) | Ti as $TiO_2$ (percent) | Fe as $Fe_2O_3$ (percent) | Si as $SiO_2$ (percent) |
|---|---|---|---|---|
| Run 614–9: |  |  |  |  |
| Ore | 4,000 | 34.1 | 52.0 | 3.52 |
| Magnetic | 560 | 35.0 | 59.5 | 2.12 |
| Middles | 2,813 | 38.6 | 58.2 | 1.18 |
| Non-magnetic | 612 | 17.9 | 16.5 | 24.68 |
| Run 614–7: |  |  |  |  |
| Ore | 1,280 | 36.8 | 58.6 | 6.4 |
| Magnetic | 305 | 32.7 | 62.8 | 2.3 |
| Non-magnetic | 219 | 9.8 | 26.5 | 20.7 |
| Middles | 746 | 36.5 | 64.1 | 1.0 |

In other runs wherein the ore was separated from much of the siliceous gangue by gravity separation instead of magnetic separation, the silica in the product at this stage was lowered from between about 3 and 6% to around 1% and sometimes to as little as 0.3%. It is preferred to conduct the separation so as to obtain silica contents as low as economically feasible since some of the iron in the ore seems to be chemically associated with the silica.

The low silica concentrate was now milled to minus 325 mesh (Tyler standard) and then digested at 110° C. for between 12 and 24 hours in 32% HCl. The digestion was cooled and filtered and the precipitate of titanium hydrate was washed.

It should be understood at this point that the foregoing processing has failed to produce a $TiO_2$ product of a sufficient purity to qualify as ceramic grade $TiO_2$ principally because the iron content is still undesirably high ranging from about 1% to as much as 5%. By the technique constituting the present invention, a method has been devised for removing this iron quantitatively, i.e. for lowering the iron content to the order of 0.01% or less.

There are no officially published specifications for ceramic grade titanium oxide which include the analyses for trace elements. Such specifications define merely the minimum content of titanium oxide for the specific pigment. The specifications for trace elements which have developed for ceramic grade titanium oxide products have been established through experience. The usual concern is with such elements as compounds of copper, manganese, chromium, and iron. In Table 1 is given an analysis of a ceramic grade titanium oxide with respect to limits of impurity content which has been found to be suitable for white color coat enamels. The results obtained in accordance with run No. 2 covering the same trace impurities are given in this table.

Table 1
COMPARATIVE ANALYSIS

|  | $TiO_2$ Ceramic Grade (Percent) | Run No. 2 Analysis (Percent) |
|---|---|---|
| $TiO_2$ | 96.0 minimum | 98.1 |
| $SiO_2$ | 2.5 maximum | 1.02 |
| $H_2O$ | 1.0 maximum | 0.12 |
| CuO | 0.005 maximum | <0.001 |
| $MnO_2$ | 0.01 maximum | <0.001 |
| $Cr_2O_3$ | 0.002 maximum | <0.001 |
| $Fe_2O_3$ | 0.05 maximum | 0.0054 |
| $Al_2O_3$ | 0.5 maximum | 0.36 |
| CaO | 0.2 maximum | 0.12 |
| $P_2O_5$ | 0.3 maximum | 0.22 |

IRON REMOVAL

Iron has been selectively removed from the impure titanium hydrate produced as described above by exposure of the hydrate to a chlorinating agent in a suitably controlled atmosphere.

In one series of runs, the titanium hydrate, loaded in a porcelain boat, was charged into a tube furnace and heated to a chlorinating temperature of between 700° C. and 850° C. while exposed to a mixture of air with a chlorinating agent selected from the group consisting of HCl, $Cl_2$, phosgene, and mixtures of such gases; the air was either dry or wet, but to effect quantitative removal of the iron without accompanying loss of Ti, the presence of moisture was found to be mandatory.

In a second series of runs, the titanium hydrate was loaded into a porous boat and processed as above. Because the chlorinating gas had better access to the material charged in the boat, the removal of iron was more readily effected than in the preceding runs in the non-porous porcelain boat.

Still another series of runs was carried out in a rotary calciner, wherein the rotation of the tubular body of the kiln caused the continuous exposure of a fresh surface of the contaminated material. It was found that, when carried out in this apparatus with a suitable atmosphere, the quantitative separation of the iron and other chlorinatible impurities from the titanium was readily achieved without accompanying chlorination of the titanium.

In FIGURE 2, there is shown schematically a preferred apparatus for carrying out the invention, but it will be understood that other apparatus could be substituted. For example, the finely divided titanium hydrate could be maintained in a fluidized state by flowing a mixture of air, moisture, and chlorinating gas through the hydrate; the iron chloride and other metal chloride products being evolved as a gas and the purified hydrate being continuously or intermittently withdrawn from the system and replaced by a corresponding amout of contaminated hydrate to be processed.

The preferred apparatus shown includes a rotary calciner 10 consisting of an inclined rotatable tubular body portion 12, gear rings 14 and 16 coupled to a motor driven gear 18; a tube 20 serves to introduce a suitable gas mixture into an open end 22 of body portion 12, through a nozzle tip 24 at one end of tube 20. A suitable chlorinating gas supplied to tube 20 from one or more sources through a proportioning valve. Preferably the chlorinating gases are bubbled through saturated aqueous solutions of the gases employed to provide a wet chlorinating atmosphere. Electrical or other heating means 28 is provided to maintain tube 12 and its contents at any suitable temperature between 500° C. and 850° C., the temperature of 760° C. being preferred with the concentrate described above.

A hopper 30 supplies the titanium hydrate to the upper end of tube 12 and an offtake 32 collects the gases leaving the tube. The metal chlorides are separated from the chlorinating gas and air by cooling the exit gases, and the uncondensed gases are returned to the system for reuse. The uncondensed gases are returned to the process either to the digestion apparatus or to the chlorination apparatus.

In the system shown, air from the surrounding atmosphere is aspirated into tube 12 by action of the jet issuing from nozzle 24. A positive moist air feed may be substituted and the open end 22 of tube 12 may be closed, if desired, with a plug through which means are provided to admit inlet tube 20.

Similarly, the filtrate from the digestion step may be processed to yield additional HCl whereby the over-all process is rendered virtually self-sufficient with regard to this reagent. For example, the filtrate from the digestion step may be sprayed onto heated pipes whereby the ferric chloride is cracked to yield ferric oxide or ferric hydrate and HCl gas. The HCl gas may be conducted either to the chlorination furnace or returned to the digestion apparatus.

Because of the quantitative results obtained, it should be noted that the separation of iron in the earlier digestion step need not be as complete as heretofore believed necessary. Thus silica and pyrites may be removed from the crushed ore on a Wilfley table and then digestion may be effected with HCl to separate most of the iron from the titanium values. Thereafter the remainder of the iron is quantitatively removed by the process described.

EXAMPLE

Using the apparatus of FIGURE 2, with equal volumes of HCl and $Cl_2$ supplied through a glass tube having a diameter of about ¼ inch at tip 24 at a rate of about 1 liter per minute, about 60 liters of HCl and $Cl_2$ mixture were passed into the tube along with from 30 to 35 liters of moistened air, aspirated by the jet issuing from tip 24. The temperature was maintained at 800° C. after about one hour, during which 250 grams of contaminated material were treated. Typical results were as follows:

|  | Run No. 1 | Run No. 2 |
|---|---|---|
| Original iron content (percent) | 1.56 | 1.56 |
| Final iron content (percent) | .04 | .0054 |
| Percent iron removed | 97.4 | 99.6 |

The product was found to pass the rigid tests for a ceramic grade $TiO_2$ and the product of run 2 had the analysis as given in Table 1.

In the above specific example and foregoing description there is set forth a preferred embodiment of the invention, in compliance with the patent statutes, but it is to be understood that the example is illustrative and is not to be taken as limitative of the invention, which is intended to include any equivalent procedures within the scope of the appended claims.

I claim:
1. A process for purifying titanium dioxide material contaminated with compounds of metals which form colored oxides and thereby disqualify the material as a ceramic grade $TiO_2$ which comprises: chlorinating the impurities in said material in finely divided form at a temperature between about 500° C. and 850° C. by contacting the finely divided material with a mixture of air and at least one chlorinating gas selected from the group consisting of HCl, $Cl_2$, $COCl_2$ and mixtures thereof, there having been added to said mixture, sufficient water to increase the moisture content of same to between 0.5% and 5% by weight, which is an amount of water vapor sufficient to inhibit chlorination of the titanium dioxide at the reaction conditions stated while permitting purification of the titanium dioxide by the quantitative removal of the chlorinatible impurities from said contaminated material.

2. The process of claim 1 wherein the chlorinating gas is a mixture of HCl and $Cl_2$.

3. The process of claim 2 wherein the relative proportions of HCl and $Cl_2$ in said mixture lie between 1:4 and 4:1.

4. A process for purifying contaminated titanium dioxide which comprises: chlorinating the chlorinatible impurities in said contaminated titanium dioxide at a temperature between about 500° C. and 850° C. by exposing said contaminated titanium dioxide in finely divided form in a rotary calciner to a chlorinating atmosphere consisting of a mixture of between 40% and 80% of the total mixture of (1) chlorinating gas selected from the group consisting of $Cl_2$, HCl, $COCl_2$ and mixtures thereof and (2) between 20% and 60% of the total mixture of air to which sufficient moisture has been added to bring the moisture content to between 0.5% and 5% by weight, thereby removing the contaminants as volatile chlorides, and recovering the resulting purified titanium dioxide product.

5. A process for purifying a titanium dioxide material contaminated with compounds of metals which form colored oxides and thereby disqualify the material as a ceramic grade $TiO_2$ which comprises: chlorinating the impurities in a carbon-free charge of said material at a temperature between about 500° C. and 850° C. by contacting said material in finely divided form with a mixture of moist air and chlorinating gas selected from the group consisting of HCl, $Cl_2$, $COCl_2$ and mixtures thereof, containing in addition to the moisture originally present in the gases constituting said mixture, sufficient additional moisture to increase the moisture in said mixture to between 0.5% and 5% of water vapor, which is an amount of water vapor sufficient to inhibit chlorination of the titanium dioxide while permitting quantitative removal of the impurities from said charge, and recovering the purified product.

6. A process for producing ceramic grade titanium dioxide which comprises: digesting a titanium dioxide mineral in concentrated HCl; cooling the digestion products to precipitate the titanium values as a contaminated hydrate in a liquid containing the bulk of the contaminants originally present in said mineral; recovering the titanium hydrate from the liquid products of said digestion; drying said hydrate; and chlorinating the impurities in said hydrate at a temperature between about 500° C. and 850° C. by contacting the finely divided hydrate with a mixture of moisture and chlorinating gas selected from the group consisting of HCl, $Cl_2$, $COCl_2$ and mixtures thereof and containing in addition to moisture originally present in the gases constituting said mixture, sufficient additional water to increase the moisture in said mixture to between 0.5% and 5% of water vapor, which is an amount of water vapor sufficient to inhibit chlorination of the titanium dioxide while permitting quantitative removal of the chlorinatible impurities therefrom.

7. A process for purifying contaminated titanium dioxide material and recovering the contaminants as chlorides which comprises: chlorinating said contaminated material at a temperature between about 500° C. and 850° C. by finely dividing said material and contacting the finally divided material with a mixture of air and chlorinating gas selected from the group consisting of HCl, $Cl_2$, $COCl_2$ and mixtures thereof, and containing in addition to the moisture originally present in the gases constituting said mixture, sufficient additional moisture to increase the moisture in said mixture to between 0.5% and 5% of water vapor, which is an amount of water vapor sufficient to inhibit chlorination of the titanium dioxide while permitting quantitative removal of the contaminants, and condensing the gaseous products of said contact, to recover the chlorides so produced.

8. A process for producing ceramic grade titanium dioxide which comprises: digesting ilmenite in concentrated hydrochloric acid to produce a liquid containing the major portion of the iron in said ilmenite as a digestion liquid and a solid containing the major portion of the titanium in said ilmenite as an iron contaminated titanium dioxide material; chlorinating the iron and other chlorinatible contaminants in said solid material at a temperature between about 500° C. and 850° C. by contacting said solid material with a mixture of moist air and chlorinating gas, said mixture containing in addition to the moisture originally present in the gases constituting said mixture, sufficient additional moisture to increase the moisture in said mixture to between 0.5% and 5% of water vapor, which is an amount of water vapor sufficient to inhibit chlorination of the titanium dioxide while permitting quantitative removal of the iron therefrom, heating said digestion liquid to crack said liquid to an iron-oxygen product and HCl, and recycling the HCl to at least one of the two process steps, digestion and chlorination.

9. A process for removing iron from a finely divided iron-contaminated titanium dioxide rich material which comprises chlorinating said material at a temperature between about 500° C. and 850° C. by contacting the finely divided material with a mixture of 20–60% air, balance HCl and $Cl_2$ in equal proportions, said air containing between 0.5 and 5.0% water vapor to inhibit chlorination of the titanium dioxide while permitting quantitative removal of the iron therefrom.

References Cited in the file of this patent

UNITED STATES PATENTS

| | | |
|---|---|---|
| 1,845,342 | Saklatwalla | Feb. 16, 1932 |
| 2,183,365 | Booge | Dec. 12, 1939 |
| 2,291,206 | Bowes | July 28, 1942 |
| 2,589,466 | Wilcox | Mar. 18, 1952 |

OTHER REFERENCES

McPherson and Henderson book, "A Course in General Chemistry," third ed. (1927), pages 163–164., Ginn and Co., N.Y.